(12) United States Patent
Schlipf (10) Patent No.: US 10,587,087 B2
(45) Date of Patent: Mar. 10, 2020

(54) METHOD FOR CONNECTING AN ELECTRICAL DEVICE TO A CONNECTION CABLE AND ELECTRICAL DEVICE WITH A CONNECTION CABLE

(71) Applicant: TÜRK & HILLINGER GMBH, Tuttlingen (DE)

(72) Inventor: Andreas Schlipf, Tuttlingen (DE)

(73) Assignee: TÜRK & HILLINGER GMBH, Tuttlingen (DE)

(*) Notice: Subject to any disclaimer, the term of this patent is extended or adjusted under 35 U.S.C. 154(b) by 0 days.

(21) Appl. No.: 15/895,275

(22) Filed: Feb. 13, 2018

(65) Prior Publication Data

US 2018/0233870 A1 Aug. 16, 2018

(30) Foreign Application Priority Data

Feb. 14, 2017 (DE) .................. 10 2017 102 912

(51) Int. Cl.
*H01R 4/00* (2006.01)
*H01R 43/20* (2006.01)
(Continued)

(52) U.S. Cl.
CPC ............ *H01R 43/20* (2013.01); *H01R 4/021* (2013.01); *H01R 4/60* (2013.01); *H01R 4/70* (2013.01);
(Continued)

(58) Field of Classification Search
CPC . H01R 4/02; H01R 4/021; H01R 4/70; H01R 4/027; H01R 9/11; H01R 15/18; H01R 43/20; H01R 43/0263
(Continued)

(56) References Cited

U.S. PATENT DOCUMENTS

| 3,839,623 | A | * | 10/1974 | Portmann | ................. | H05B 3/06 174/75 B |
| 5,034,595 | A | * | 7/1991 | Grendys | .................. | H05B 3/06 219/541 |
| 2006/0013282 | A1 | * | 1/2006 | Hanzawa | ................. | G01K 1/08 374/163 |
| 2011/0222583 | A1 | * | 9/2011 | Boghun | ................. | B23K 26/22 374/208 |

(Continued)

FOREIGN PATENT DOCUMENTS

DE 32 34 059 A1 3/1984
DE 10 2005 009 927 A1 12/2005
(Continued)

*Primary Examiner* — William H. Mayo, III
(74) *Attorney, Agent, or Firm* — McGlew and Tuttle, P.C.

(57) ABSTRACT

A method connects an electrical device (10), which has a tubular metal sheath (13) with protruding electrical conductors and contact sections (11, 12) connecting to contact sections (21, 22) of electrical conductors (23, 24) of a connection cable (20) by an insulating element (40, 140) that has receptacles (41, 42, 43, 44, 141, 142, 143, 144). The respective contact sections (11, 21, 12, 22) overlap one another or are adjacent to one another in the contact area (45, 48, 145, 148), and establish an electrical connection (51, 52) between the respective contact sections (11, 21, 12, 22). The electrical connection (51, 52) is established through an opening (46, 47, 49, 50, 146, 147, 149, 150), which forms an additional access to the contact area (45, 48, 145, 148). An electrical device (10) is provided with receptacles with the opening, which forms an additional access to the contact area.

22 Claims, 4 Drawing Sheets

(51) Int. Cl.
  *H01R 4/02*   (2006.01)
  *H01R 4/60*   (2006.01)
  *H01R 4/70*   (2006.01)
  *H01R 9/11*   (2006.01)
  *H01R 43/02*  (2006.01)
  *H02G 15/18*  (2006.01)
  *H01R 4/18*   (2006.01)

(52) U.S. Cl.
  CPC ........... *H01R 9/11* (2013.01); *H01R 43/0263* (2013.01); *H02G 15/18* (2013.01); *H01R 4/027* (2013.01); *H01R 4/18* (2013.01)

(58) Field of Classification Search
  USPC .................... 174/74 R, 78, 84 R, 84 C, 88 R
  See application file for complete search history.

(56) References Cited

U.S. PATENT DOCUMENTS

| | | |
|---|---|---|
| 2011/0777583 | 9/2011 | Boghun et al. |
| 2016/0014844 A1 | 1/2016 | Schlipf |

FOREIGN PATENT DOCUMENTS

| | | | | |
|---|---|---|---|---|
| DE | 102009026402 A | * | 1/2006 | ............. G01D 21/00 |
| DE | 10 2007 000315 A1 | | 12/2007 | |
| DE | 10 2009 026 402 A1 | | 5/2010 | |
| DE | 10 2014 109 720 A1 | | 1/2016 | |
| EP | 1622424 A1 | * | 1/2006 | ............... H01R 4/18 |
| EP | 1 622 424 A1 | | 2/2006 | |

\* cited by examiner

METHOD FOR CONNECTING AN ELECTRICAL DEVICE TO A CONNECTION CABLE AND ELECTRICAL DEVICE WITH A CONNECTION CABLE

CROSS REFERENCE TO RELATED APPLICATIONS

This application claims the benefit of priority under 35 U.S.C. § 119 of German Application 10 2017 102 912.5, filed Feb. 14, 2017, the entire contents of which are incorporated herein by reference.

FIELD OF THE INVENTION

The present invention pertains to an electrical device with a tubular metal sheath and contact sections, protruding from the tubular metal sheath, that are connected to contact sections of electrical conductors of a connection cable, wherein an insulating element is provided with receptacles for insertion one or more contact section and the receptacles merge into one another in a contact area. The present invention further pertains to a method for connecting an electrical device, which has a tubular metal sheath and contact sections of electrical conductors of the electrical device protruding from the tubular metal sheath on a front side, to contact sections of electrical conductors of a connection cable.

BACKGROUND OF THE INVENTION

Up to now, to connect an electrical device, which has a tubular metal sheath and contact sections of electrical conductors protruding from the tubular metal sheath on the front side, as is especially the case in a compacted or uncompacted, coiled, cartridge-type heater or a PTC cartridge-type heater, a sheathed thermocouple or PTC/NTC sensors with a metal sheath, to a connection cable, a connection of especially bare, i.e., bared or uninsulated ends of conductors of the electrical heater, especially of the led-out connection wires or connection leads thereof, which may also be twisted or stranded with one another, to the corresponding bare ends of conductors of the connection cable is usually first established, e.g., by welding, soldering, caulking or crimping, and then insulation is arranged over the connection point.

This arrangement of the insulation may take place, for example, by an insulating tubing, which is pushed over and possibly shrunk onto the connection point. Especially if only little space is present between the individual conductor ends of the electrical heater, pushing on of the insulating tubing has often proven to be difficult and remains incomplete, which may then lead to short-circuits and operating problems of the electrical heater.

Other possibilities known up to now are, e.g., enveloping the connection point with cut foils or with adhesive tapes, especially with high-temperature adhesive tapes, which are highly labor-intensive processes, or sealing with a pourable sealing compound, which, however, does not always reliably reach bare parts, which may especially lead to the tightness, e.g., against steam, no longer being sufficient.

It has thus been shown in practice that these approaches known up to now are all relatively time-consuming and/or are prone to error and require a considerable floor space, so that an undesired, long, unheated length is formed.

SUMMARY OF THE INVENTION

Hence, an object of the present invention is to provide a method for connecting an electrical device to a connection cable and an electrical device with a connection cable, which method leads to improvements especially in terms of space requirement in the axial and radial directions, connection quality, process safety and simplicity of establishing the connection and thus allows an industrially processable production.

This object is accomplished by a method, with the features, according to the present invention. The method according to the present invention for connecting an electrical device, which has a tubular metal sheath and contact sections of electrical conductors of the electrical device protruding from the tubular metal sheath on the front side, to contact sections of electrical conductors of a connection cable, comprises at least the steps:

Provision of an insulating element, which consists of an electrically insulating material, with receptacles for insertion of at least one contact section of an electrical conductor of the electrical device and of at least one contact section of an electrical conductor of the connection cable, wherein the receptacles merge into one another in a contact area and with at least one opening, which forms an additional access to the contact area, insertion of at least one contact section of an electrical conductor of the electrical device and of at least one contact section of an electrical conductor of the connection cable into receptacles of the insulating element, so that the respective contact sections protrude into the contact area, wherein they preferably overlap one another or are adjacent to one another, and establishing of an electrical connection between the respective contact sections, wherein this electrical connection is established through the opening, which forms the additional access to the contact area.

In this case, it is preferable that the steps are carried out in the sequence indicated. The sections to be electrically contacted with one another are thus first positioned and insulated and only then is the electrical connection established.

The method is especially well suited for connecting cartridge-type heaters, especially compacted and uncompacted, coiled, cartridge-type heaters, or PTC cartridge-type heaters, sheath thermometers and PTC/NTC sensors with a metal sheath.

For example, plastics, especially PEEK, PFA or FEP, PA, POM, PVC, PE, ceramic, and especially densely sintered or porous ceramic, silicone or rubber, are proposed as material for the insulating element.

An exactly fitting and reproducible positioning of the respective contact sections can be ensured by the receptacles of the insulating element. In particular, unlike in the cases known from the state of the art, in which contact sections mounted together into an insulating sleeve are contacted with one another by pressing, the receptacles may be configured by adapting their cross section such that the contact sections are mounted without clearance in at least some sections of these receptacles. This then also ensures that the contact sections are brought together in a reproducible manner in case of a welding with a touch-type electrode or a resistance welding process, so that the established electrical contact is outstandingly reproducible.

In this connection, short distances and thus short, unheated lengths, which are especially not longer than three times the diameter of the metal sheath, preferably not longer than twice the diameter of the metal sheath and especially preferably not longer than the diameter of the metal sheath, are advantageously made possible.

At the same time, the insulating element configured according to the present invention ensures the spatial and electrical separation of the individual conductors of the connection cable and thus avoids short-circuits. Even further, a mechanical relief of the connection points is brought about, which improves the stability thereof in the long run.

It is, however, pointed out that the words "at least" in the wording "receptacles for insertion of at least one contact section of an electrical conductor of the electrical device and of at least one contact section of an electrical conductor of the connection cable" may not only mean that a plurality of contact sections of an electrical conductor of the electrical device and a plurality of contact sections of an electrical conductor of the connection cable may be provided in the insulating element, but also may include the possibility that in addition to the (bare) contact section, another insulated section of the electrical conductor may also be inserted.

The insertion of the contact areas of the electrical device may, in principle, take place before or after the insertion of the contact areas of the connection cable.

By the provision of openings, which offer an additional access to the contact area, in the insulating element, it is made possible at the same time to establish the electrical connection between the respective contact sections directly and at an exactly preset position, which increases the process reliability. At the same time, after the connection, the openings provide the possibility of checking the electrical connection and possibly the properties thereof at least during the production process, which makes possible a simplified quality assurance.

According to a preferred embodiment of the method, provisions are made for at least one contact section of an electrical conductor of the electrical device or of the connection cable to be inserted so far into a receptacle of the insulating element that an insulated section of the electrical conductor, which section is adjacent to the contact section, dips into the insulating element. This ensures that optimal ground protection is achieved.

It is preferable here when the corresponding receptacle of the insulating element on the insertion side (i.e., on the side, from which the contact section in question is inserted into the receptacle) has an insertion aid and/or a stop, because in case of a preset length of the contact section, the depth, up to which it is inserted, can thereby be easily reproduced, which likewise contributes to a desirable simplification of the properties of various connections established in this way.

The establishing of an electrical connection between the respective contact sections may take place in the usual manner by welding, soldering, crimping, bonding or caulking thanks to the opening(s) provided in the insulating element.

When the insulating element is positioned such that the insulating element is present at the tubular sheath of the electrical device or dips into same in a defined manner during the insertion, the buckling stability is further improved, on the one hand, and the achieved positioning accuracy and reproducibility of the electrical device is again improved, on the other hand. In this connection, "to be present" is defined not only as a direct contact, but also as a positioning at a sufficiently short distance that a short-circuit or short-circuit to ground is reliably avoided.

It is especially preferred when the at least one opening is at least partly closed after establishing the electrical connection. This may occur, for example, by the opening being cemented or being filled or injected with silicone rubber, epoxy resin, plastic or ceramic. A cover made of plastic or ceramic may also be used for this purpose. In this manner, the established electrical connection is reliably protected against external effects and it is ensured that a short-circuit cannot occur even at the connection point.

According to an advantageous variant of the method, provisions are made for the electrical device to be grounded by connection to a ground conductor of the connection cable running outside of the insulating element. Because the ground conductor runs outside of the insulating element, the risk for an undesired short-circuit between the ground conductors and other conductors is reduced. It is preferred for many applications when the metal sheath of the electrical device is connected, with the ground conductor, to a defined ground potential. Of course, such a grounding may also take place within the insulating element, which then preferably has an additional pair of receptacles for the ground conductors.

It has further proven to be advantageous when a sleeve is pushed onto the connection cable and it is positioned, after the electrical connection has been established, such that it encloses the insulating element entirely or partly. This sleeve, which may be configured as a metallic rotating part or pipe section, but also as a plastic sleeve, may have a short configuration and then especially require only minimal space for installation, when it projects neither outwardly nor inwardly over the metal sheath of the electrical device as viewed in the radial direction.

The sleeve performs a plurality of functions:

On the one hand, in itself, it already further increases the protection of the insulating element and of the electrical connection established in the contact area thereof. The gain in stability, which is thus achieved, is further increased when the sleeve, after establishing the electrical connection, is also positioned such that it is in contact with the tubular sheath, and especially when the sleeve, after it was positioned such that it is in contact with the tubular sheath, is fastened to the tubular sheath, e.g., it is welded together with same in case of a sleeve made of metal.

On the other hand, it is made possible by the presence of such a sleeve that hollow spaces between the sleeve and the insulating element are entirely or partly filled with silicone rubber or an epoxy resin or are foamed or filled with an insulating material. This leads to a mechanical stabilization, even further improved electrical insulation and to a fixing of the insulating element in a defined position. In addition, an improved tightness against moisture and vapors is achieved.

Further, the sleeve guides and centers the connecting line at the outlet of the sleeve, which leads to a further reduction in the mechanical load of the electrical connection.

The electrical device according to the present invention, which is especially preferably a cartridge-type heater, a sheath thermocouple or a PCT/NCT sensor with a metal sheath, has a tubular metal sheath and contact sections of electrical conductors of the electrical device protruding from the tubular metal sheath on the front side, which contact sections are connected to contact sections of electrical conductors of a connection cable.

The electrical device according to the present invention further has an insulating element, which consists of an electrically insulating material, with receptacles for insertion of at least one contact section of an electrical conductor of the electrical device and of at least one contact section of an electrical conductor of the connection cable, wherein the receptacles merge into one another in a contact area. It is essential to the present invention that the insulating element have at least one additional opening, which forms an additional access to the contact area, wherein an electrical connection is established between the respective contact sections in the area of the opening, which forms the additional access to the contact area.

By providing openings that offer an additional access to the contact area in the insulating element, it becomes possible at the same time to establish the electrical connection between the respective contact sections directly and at an exactly preset position, which increases the process reliability. Likewise, after the connection, the openings make it possible to check the electrical connection and possibly its properties at least during the production process, which makes possible a simplified quality assurance.

At the same time, an exactly fitting and reproducible positioning of the respective contact sections can be ensured by the receptacles of the insulating element. In particular, they can be configured by adapting their cross section such that the contact sections are received without clearance in at least some sections of these receptacles.

The additional opening of the insulating element is entirely or partly filled, covered or closed according to an advantageous variant of the present invention. This may, for example, be achieved by the opening being cemented or being filled or injected with silicone rubber, epoxy resin, plastic or ceramic compound. A cover made of plastic or ceramic may also be used for this purpose. In this way, the established electrical connection is reliably protected against external effects, e.g., the penetration of moisture, gases or vapors, and it is ensured that a short-circuit cannot occur at the connection point either.

The insulating element is preferably such that the receptacles for insertion of at least one contact section of an electrical conductor of the electrical device and of at least one contact section of an electrical conductor of the connection cable guide the respective contact sections such that they overlap one another in the contact area.

When the receptacles for insertion of at least one contact section of an electrical conductor of the electrical device and the receptacles for insertion of at least one contact section of an electrical conductor of the connection cable have different cross sections, an optimization of the electrical contact is ensured in a reliable process especially during welding due to a precise definition of position.

It is especially advantageous when the insulating element is entirely or partly enclosed by a sleeve, i.e., a section of the sleeve is in essentially a radial direction to the running direction of the cable. This sleeve, which may be configured as a metallic rotating part or pipe section, but also as a plastic sleeve, performs a plurality of functions:

On the one hand, in itself, it already further increases the protection of the insulating element and of the electrical connection established in the contact area thereof. The gain in stability, which is thus achieved, is further increased when the sleeve, after establishing the electrical connection, is also positioned such that it is in contact with the tubular sheath, and especially when the sleeve, after it was positioned such that it is in contact with the tubular sheath, is fastened to the tubular sheath, e.g., it is welded together with same in case of a sleeve made of metal.

In the last-mentioned configuration, it is especially also possible that a defined potential of the metal sheath of the electrical device is generated by a ground line of the connection cable, which runs outside of the insulating element and which is brought into electrical contact with the sleeve, which is then in electrically conductive connection to the metal sheath. This has the great advantage that a short-circuit between the ground line and a current-carrying line of the electrical device can be reliably avoided.

On the other hand, it is made possible by the presence of such a sleeve that hollow spaces between the sleeve and the insulating element are entirely or partly filled with silicone rubber or an epoxy resin or are foamed or filled with an insulating material. This leads to a mechanical stabilization, even further improved electrical insulation and to a fixing of the insulating element in a defined position.

The present invention is explained in detail below on the basis of figures, which show exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1A, 1B, 4:
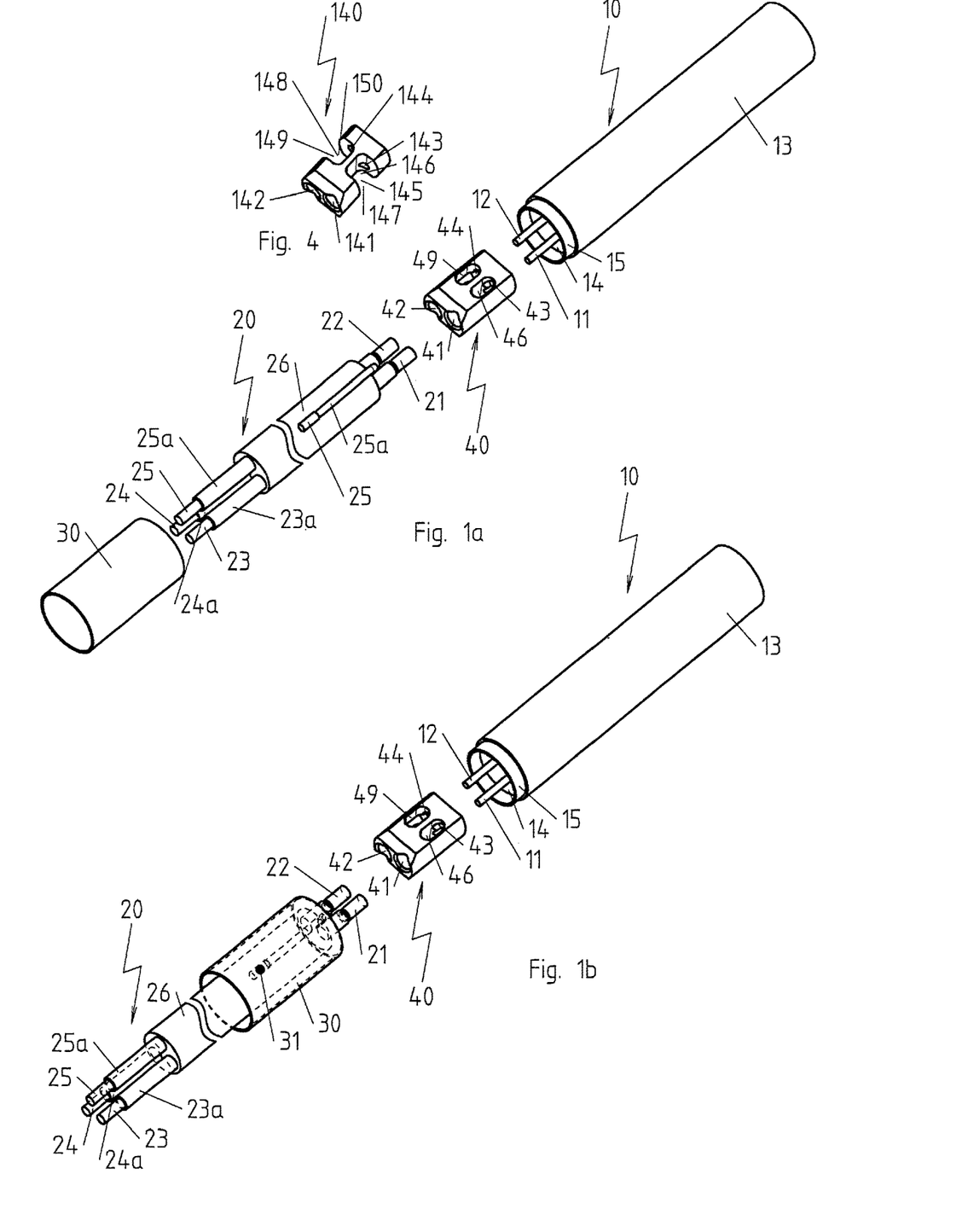
FIG. 1a is a perspective view showing a first stage of an exemplary method according to the present invention.
FIG. 1b is a perspective view showing a second stage of the exemplary method according to the present invention.
FIG. 4 is a perspective view showing an alternative embodiment of an insulating element.

Referring to the drawings, FIG. 1a shows a first stage of an exemplary method for connecting an electrical device 10, which is configured in this example as a cartridge-type heater and which has a tubular metal sheath 13 and contact sections 11, 12 of electrical conductors of the electrical device protruding from the tubular metal sheath 13 on a front side thereof. Contact sections 21, 22 of electrical conductors 23, 24 of a connection cable 20 are arranged together with a ground conductor 24 in a shell 26. The individual components are provided in the method stage being shown; in this respect, at the same time FIG. 1a corresponds to a partial exploded view of the electrical device 10 with connection cable 20.

In this connection, it should also be noted that only the part of the connection cable 20 facing the electrical device 10 is shown, wherein the end of the shown section of the connection cable 20, which end faces away from the electrical device 10, is, in addition, shown without shell in order to more clearly show the configuration, arrangement and run of the electrical conductors 23, 24 with the insulation layer 23a, 24a enclosing them and of the ground conductor 25 with the insulation layer 25a enclosing it in the connection cable 20.

Besides the sheath 13 and the uninsulated, i.e., bare contact sections 11, 12, the electrical conductor of the electrical device 10 is seen at the electrical device 10. Since the electrical device 10 is a cartridge-type heater in the example shown, the electrical conductor is a heat conductor here, which may be embedded, for example, in a compacted magnesium oxide filling 14. In the end area of the tubular metal sheath 13 facing the connection cable 20, this tubular metal sheath is weakened due to a reduction of the sheath thickness, so that a ring-shaped end section 15, which is graduated in comparison to the outer diameter of the metal sheath 13 and which projects over the magnesium oxide filling 14, is present.

The end of the connection cable 20 facing the electrical device 10 is already made ready for the connection to the electrical device 10 in that the contact sections 21, 22 were exposed by removing a section of the respective insulation layers 23a, 24a to a defined length, i.e., are bare there. Further, a section of the ground conductor 25 is bent back.

Besides the electrical device 10 and the connection cable 20, a sleeve 30, which is configured here as a metal sleeve and the outer diameter of which corresponds to the outer diameter of the metal sheath 13 here and the inner diameter of which is selected such that it can be pushed onto the graduated end section 15 of the metal sheath 13, and an insulating element 40, can also be seen in FIG. 1a.

In this exemplary embodiment, the insulating element 40 has two receptacles 41, 42 for insertion of the contact sections 21, 22 of the electrical conductors 23, 24 of the connection cable 20 on the side facing the connection cable 20 and two receptacles 43, 44 for insertion of the contact sections 12, 13 of the electrical conductors of the electrical device on the side facing the electrical device 10. The receptacles 41, 42, 43, 44 may each be configured, for example, as holes.

Figure 2:
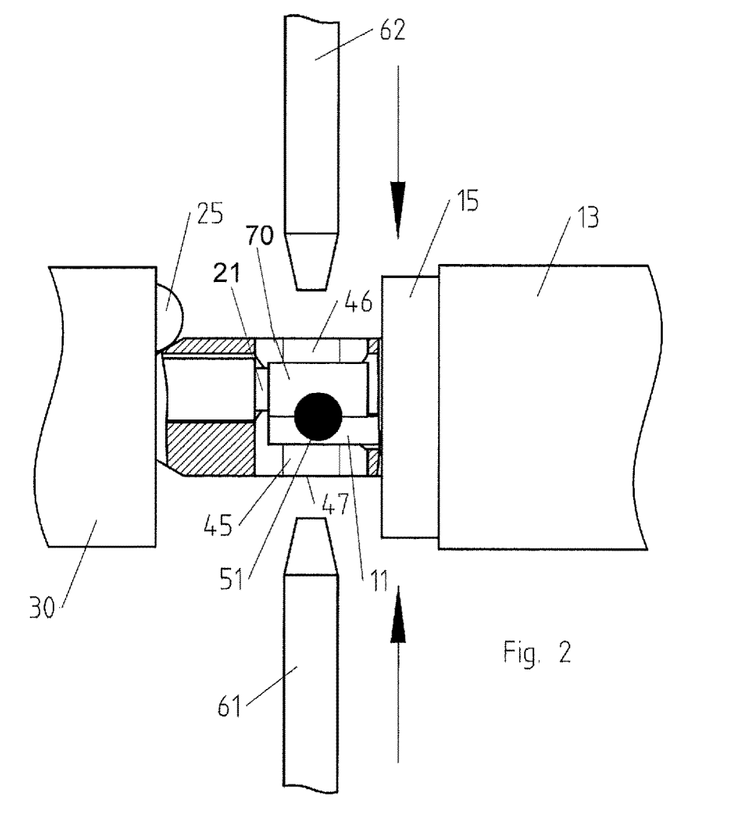
FIG. 2 is an enlarged cutout of FIG. 1e.
Figure 3:
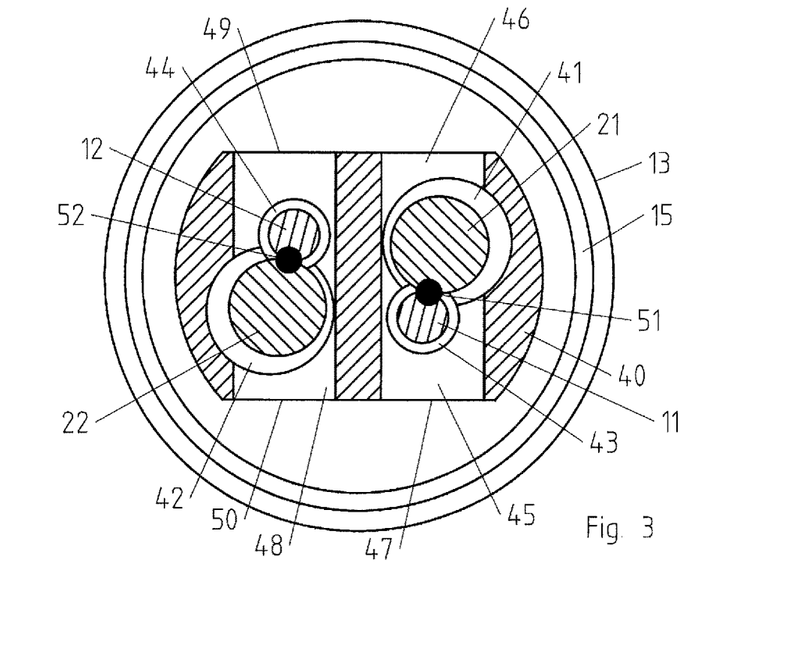
FIG. 3 is a cross sectional view through the contact areas of an insulating element of a finished electrical device with connection cable.

As is especially evident when taking FIGS. 2 and 3 into consideration, the receptacles 41 and 43, which receive a pair of contact sections 11, 21 to be brought into electrical contact with one another, run with a vertical offset to one another and have different cross sections here.

The receptacles 41 and 43 merge into one another in a contact area 45, in which the contact sections 11, 21 then overlap one another. Optionally, a crimping sleeve or welding sleeve 70 may also be provided, e.g., when one of the contact sections to a conductor consists of poorly weldable material.

The openings 46, 47 of the insulating element 40 create a separate access to the contact area 45, through which the electrical connection 51, which is shown symbolically as a black dot, can then take place or be generated, e.g., by spot welding or resistance welding. In this case, it is ensured by the guiding of the receptacles that the electrical connection is easily reproducible, because the press punches or welding punches 61, 62 always impact equally positioned contact sections 11, 21.

Following in the same principle, the receptacles 42 and 44 also merge into one another in a contact area 48, in which the contact sections 12, 22 then overlap one another. The openings 49, 50 of the insulating element 40 create a separate access to the contact area 48, through which the electrical connection 52, which is likewise symbolically shown as a black dot, can then take place or be generated.

However, in the exemplary embodiment shown, a vertical offset between the receptacles 41 and 42, on the one hand, and between the receptacles 43 and 44, on the other hand, is provided. A the same time, this vertical offset is configured in a manner, which causes the receptacle 41 to run above the receptacle 43, but the receptacle 42 to run below the receptacle 44. Thus, there are also a vertical offset between the different receptacles 41, 42 for the contact areas 21, 22 of the electrical conductors 23, 24 of the connection cable 20 and a vertical offset between the different receptacles 43, 44 for the contact areas 11, 12 of the electrical conductors of the electrical device 10. It becomes possible thereby to optimally utilize the available cross section of the insulating element 40.

The alternative insulating element 140 shown in FIG. 4 has a largely identical configuration, so that reference can be made to the description of the insulating element 40, with the reference numbers obtained by adding 100 to the reference numbers used there. The difference is only that the openings 46, 47, 49, 50 are window-like, while the openings 146, 147, 149, 150 have no peripheral edge, but are configured as recesses.

In the stage of the method shown in FIG. 1b, the sleeve 30 has been pushed onto the connection cable 20 and the ground conductor 25 has been connected via an electrical contact 31, which can be achieved, e.g., by soldering or welding, on the inner side of the sleeve 30, to the sleeve 30.

Figures 1C, 1D:
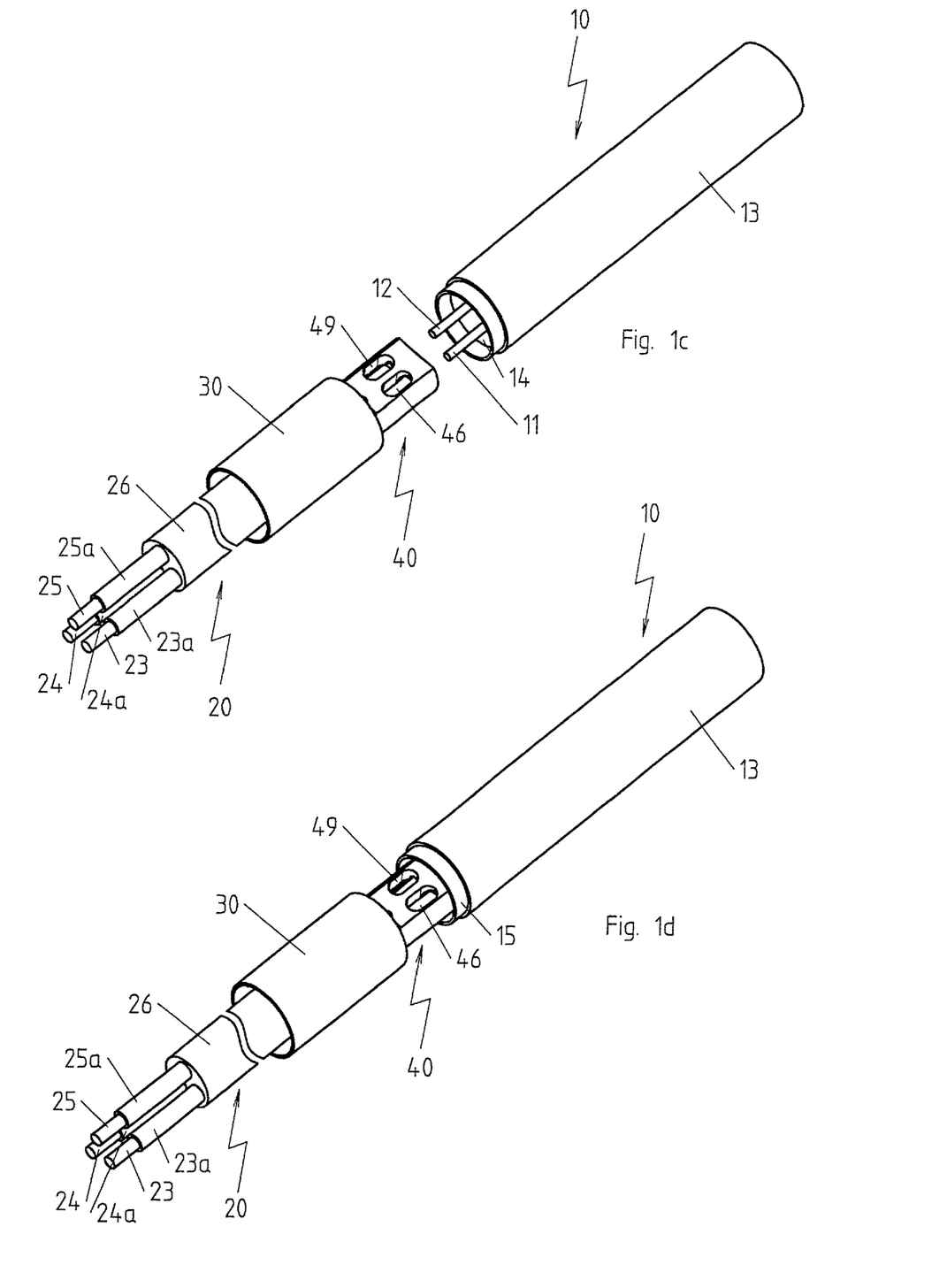
FIG. 1c is a perspective view showing a third stage of the exemplary method according to the present invention.
FIG. 1d is a perspective view showing a fourth stage of the exemplary method according to the present invention.

The contact sections 21, 22 of the electrical conductors 23, 24 of the connection cable 20 have been inserted into the receptacles 41, 42 of the insulating element in the stage of the method shown in FIG. 1c. In the stage of the method shown in FIG. 1d, the contact sections 11, 12 of conductors of the electrical device are then also additionally inserted, wherein the insulating element 40 partly dips into the tube opening of the tubular metal sheath and in this case can especially rest against the surface of the compacted magnesium oxide filling 14. Thus, a high and easily reproducible positioning accuracy can be achieved especially in conjunction with a defined length of the contact sections 21, 22 and use of the insulation of the sections of the conductors of the connection cable 20, which sections are adjacent to these contact sections, as a stop.

Figure 1E:
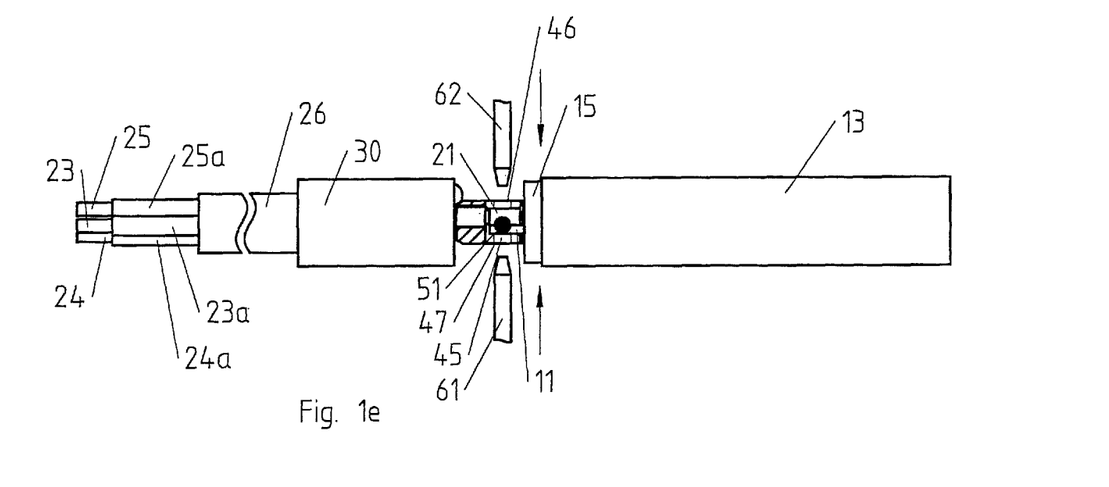
FIG. 1e is a side view showing a fifth stage of the exemplary method according to the present invention, wherein the insulating element is shown in the opened state.

The process of establishing the electrical connection, for example, by pressing or welding by means of press punches or welding punches 61, 62, which each dip into the contact area 45 through the openings 46, 47, as is illustrated by the arrows, is schematically shown in FIG. 1e. Optionally, the openings 46, 47 or 49, 50 can then be closed before further steps are carried out.

Figure 1F:
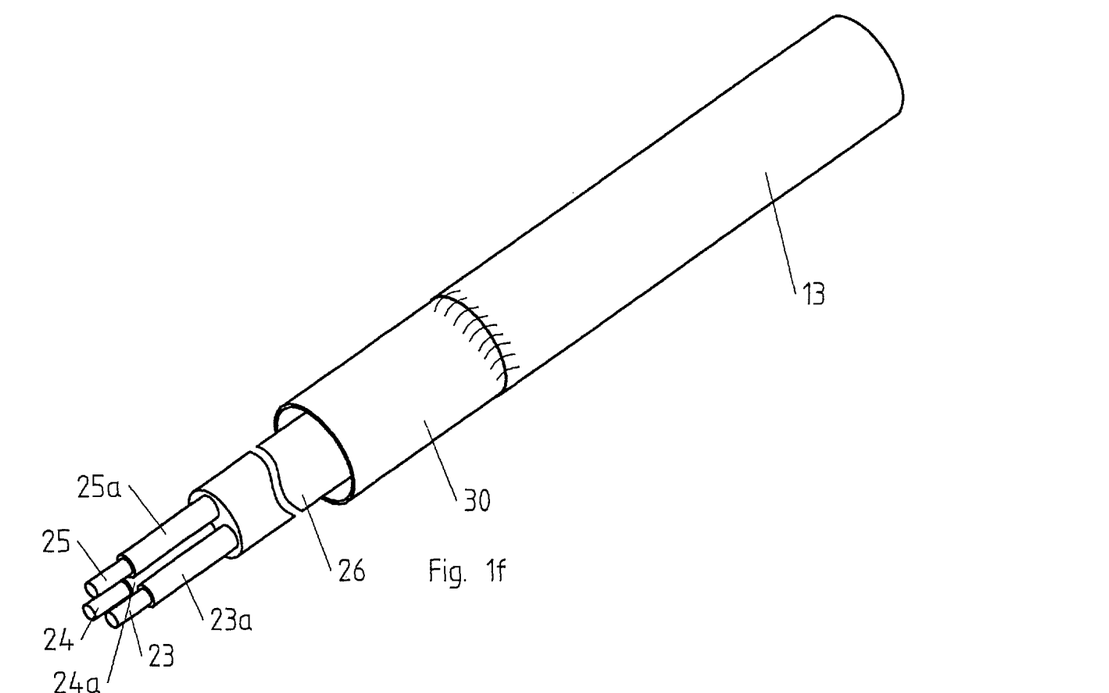
FIG. 1f is a perspective view showing a sixth stage of the exemplary method according to the present invention.

In order to reach the sixth stage of the method shown in FIG. 1f, the sleeve 30 is then also pushed onto the graduated end section 15 of the metal sheath 13 of the electrical device 10 and fastened, e.g., welded there. Thus, the metal sheath 13 is then also grounded. At the same time, the insulating element 40 is now enclosed by the sleeve 30. This also makes it possible to fill remaining hollow spaces between the sleeve and the insulating element entirely or partly with silicone rubber or with an epoxy resin or to fill or foam with an insulation material.

While specific embodiments of the invention have been shown and described in detail to illustrate the application of the principles of the invention, it will be understood that the invention may be embodied otherwise without departing from such principles.

APPENDIX

| List of reference numbers | |
|---|---|
| 10 | Electrical device |
| 11, 12 | Contact section |
| 13 | Metal sheath |

APPENDIX-continued

List of reference numbers

| | |
|---|---|
| 14 | Magnesium oxide filling |
| 15 | End section |
| 20 | Connection cable |
| 21, 22 | Contact section |
| 23, 24 | Electrical conductor |
| 23a, 24a, 25a | Insulation layer |
| 26 | Shell |
| 30 | Sleeve |
| 31 | Electrical contact |
| 40 | Insulating element |
| 41, 42, 43, 44 | Receptacle |
| 46, 47, 49, 50 | Opening |
| 45, 48 | Contact area |
| 51, 52 | Electrical connection |
| 61, 62 | Press punch or welding punch |
| 70 | Crimping sleeve or welding sleeve |
| 140 | Insulating element |
| 141, 142, 143, 144 | Receptacle |
| 146, 147, 149, 150 | Opening |
| 145, 148 | Contact area |

What is claimed is:

1. A method for connecting an electrical device, which comprises a tubular metal sheath and contact sections of electrical conductors of the electrical device protruding from the tubular metal sheath on a front side and contact sections of electrical conductors of a connection cable, the method comprising the steps of:
providing an insulating element, comprised of an electrically insulating material, with receptacles for insertion of at least one of the contact sections of the electrical conductors of the electrical device and of at least one of the contact sections of the electrical conductors of the connection cable, wherein the receptacles merge into one another in a contact area, and with at least one opening, which forms an additional access to the contact area, the additional access passing from one side of the insulating element through the insulating element to another side of the insulating element;
inserting the at least one of the contact sections of an electrical conductor of the electrical device and the at least one of the contact sections of the electrical conductor of the connection cable into the receptacles of the insulating element, so that the respective contact sections protrude into the contact area or overlap one another in the contact area or are adjacent to one another in the contact area;
establishing an electrical connection between the respective contact sections, wherein the electrical connection is established through the at least one opening which forms the additional access to the contact area;
pushing a sleeve onto the connection cable; and
after establishing the electrical connection, positioning the sleeve such that the sleeve entirely or partly encloses the insulating element.

2. A method in accordance with claim 1, wherein at least one contact section of an electrical conductor of the electrical device or of the connection cable is inserted so far into one of the receptacles of the insulating element that an insulated section of the electrical conductor, which insulated section is adjacent to the contact section, dips into the insulating element.

3. A method in accordance with claim 1, wherein the contact sections of more than one electrical conductor of the electrical device are inserted sufficiently far into receptacles of the insulating element that a distance between receptacles prevents contact between different contact sections.

4. A method in accordance with claim 1, wherein the electrical connection is established between the respective contact sections by welding, soldering, crimping, bonding or caulking, the receptacles comprising a first electrical device conductor receiving receptacle, a second electrical device conductor receiving receptacle, a first connection cable conductor receiving receptacle and a second connection cable conductor receiving receptacle, the first electrical device conductor receiving receptacle being vertically offset from the second electrical device conductor receiving receptacle, the first connection cable conductor receiving receptacle being vertically offset from the second connection cable conductor receiving receptacle.

5. A method in accordance with claim 1, wherein during the insertion, the insulating element is positioned such that a distance between the insulating element and the tubular metal sheath of the electrical device is smaller than three times a diameter thereof.

6. A method in accordance with claim 5, wherein during the insertion, the insulating element is positioned such that the insulating element is present at the tubular metal sheath of the electrical device or dips into same.

7. A method in accordance with claim 1, wherein after establishing the electrical connection the at least one opening is at least partly closed, the receptacles comprising a first electrical device conductor receiving receptacle and a second electrical device conductor receiving receptacle, the first electrical device conductor receiving receptacle being vertically offset from the second electrical device conductor receiving receptacle.

8. A method in accordance with claim 1, wherein the electrical device is grounded by a connection to a ground conductor of the connection cable, the ground conductor running outside of the insulating element, the receptacles comprising a first connection cable conductor receiving receptacle and a second connection cable conductor receiving receptacle, the first connection cable conductor receiving receptacle being vertically offset from the second connection cable conductor receiving receptacle.

9. A method in accordance with claim 1, further comprising, after establishing the electrical connection, positioning the sleeve such that the sleeve is in contact with the tubular metal sheath, wherein the sleeve is movable relative to the metal sheath and the connection cable such that at least a portion of the sleeve passes over the connection cable and the insulating element.

10. A method in accordance with claim 9, further comprising after positioning the sleeve such that the sleeve is in contact with the tubular metal sheath, fastening the sleeve to the tubular metal sheath, the sleeve comprising a sleeve interior space, at least a portion of the insulating element being arranged in the sleeve interior space.

11. A method in accordance with claim 1, further comprising entirely or partly filling hollow spaces between the sleeve and the insulating element with silicone rubber or with an epoxy resin or are foamed or filled with an insulating material.

12. A method in accordance with claim 1, wherein the sleeve is dimensioned and positioned such that the tubular metal sheath and the sleeve are aligned, such that there is no radial projection between them or the radial projection is smaller than a wall thickness of the tubular metal sheath the sleeve comprising a sleeve inner surface, the sleeve inner surface defining a sleeve interior space, the at least one opening being located in the sleeve interior space, the at least one opening facing in a direction of the sleeve inner surface, the sleeve comprising a first end portion and a second end portion, the insulating element being located between the first end portion and the second end portion.

13. An electrical device comprising:
a tubular metal sheath;
contact sections of electrical conductors of the electrical device protruding from the tubular metal sheath on a front side thereof;
contact sections of electrical conductors of a connection cable;
an insulating element comprised of electrically insulating material and having receptacles for insertion of at least one of the contact sections of the electrical conductor of the electrical device and for inserting of at least one contact sections of the electrical conductor of the connection cable; and
a sleeve, wherein the insulating element is entirely or partly enclosed by the sleeve, wherein:
the receptacles merge into one another in a contact area, wherein the insulating element has at least one additional opening, which forms an additional access to the contact are, wherein a surface of the insulating element extends continuously, without interruption, from one side of the insulating element to another side of the insulating element, the surface defining at least a portion of the at least one additional opening; and
an electrical connection is established between the respective contact sections in the area of the opening, which forms the additional access to the contact area.

14. An electrical device in accordance with claim 13, wherein the additional opening is a recess, a blind hole, or a through hole, the sleeve comprising a sleeve interior space, at least a portion of the insulating element being arranged in the sleeve interior space, the sleeve being movable relative to the connection cable prior to the sleeve being in a fixed state.

15. An electrical device in accordance with claim 14, wherein the additional opening of the insulating element is entirely or partly filled, covered or closed, the sleeve comprising a sleeve inner surface, the sleeve inner surface defining a sleeve interior space, the additional opening being located in the sleeve interior space, the additional opening facing in a direction of the sleeve inner surface, the sleeve comprising a first end portion and a second end portion, the insulating element being located between the first end portion and the second end portion.

16. An electrical device in accordance with claim 13, wherein the receptacles each comprise a guide for guiding the respective contact sections such that the respective contact sections overlap one another in the contact area, the receptacles comprising a first electrical device conductor receiving receptacle and a second electrical device conductor receiving receptacle, the first electrical device conductor receiving receptacle being vertically offset from the second electrical device conductor receiving receptacle.

17. An electrical device in accordance with claim 16, wherein the sleeve is in contact with the tubular metal sheath and is connected to same, the receptacles comprising a first connection cable conductor receiving receptacle and a second connection cable conductor receiving receptacle, the first connection cable conductor receiving receptacle being vertically offset from the second connection cable conductor receiving receptacle.

18. An electrical device in accordance with claim 13, wherein the receptacles each have different cross sections.

19. An electrical device in accordance with claim 13, wherein:

the sleeve is shorter than three times a largest diameter of the tubular metal sheath; or
the sleeve projects neither outwardly nor inwardly over the tubular metal sheath in a radial direction; or
the sleeve is shorter than three times a largest diameter of the tubular metal sheath and the sleeve projects neither outwardly nor inwardly over the tubular metal sheath in a radial direction.

20. An electrical device in accordance with claim 13, wherein hollow spaces between the insulating element and the sleeve are at least partly filled with silicone rubber or epoxy resin or are foamed or filled with an insulating material.

21. A method for connecting an electrical device, which comprises a tubular metal sheath and contact sections of electrical conductors of the electrical device protruding from the tubular metal sheath on a front side and contact sections of electrical conductors of a connection cable, the method comprising the steps of:
providing an insulating element, comprised of an electrically insulating material, with receptacles for insertion of at least one of the contact sections of the electrical conductors of the electrical device and of at least one of the contact sections of the electrical conductors of the connection cable, wherein the receptacles merge into one another in a contact area, and with at least one opening, which forms an additional access to the contact area, the insulating element comprising an insulating element surface extending continuously, without interruption, from one side of the insulating element to another side of the insulating element, the insulating element surface defining at least a portion of the at least one opening;
inserting the at least one of the contact sections of an electrical conductor of the electrical device and the at least one of the contact sections of the electrical conductor of the connection cable into the receptacles of the insulating element, so that the respective contact sections protrude into the contact area or overlap one another in the contact area or are adjacent to one another in the contact area;
providing a sleeve comprising a sleeve interior space;
moving the sleeve relative to the connection cable such that at least a portion of the connection cable is arranged in the sleeve interior space;
establishing an electrical connection between the respective contact sections after the portion of the connection cable is arranged in the sleeve interior space, wherein the electrical connection is established through the at least one opening which forms the additional access to the contact area;
after establishing the electrical connection, moving the sleeve relative to the connection cable and the insulating element such that at least a portion of the insulating element is arranged in the sleeve interior space.

22. A method in accordance with claim 21, wherein the sleeve comprises a first end portion, a second end portion and an inner sleeve surface, the inner sleeve surface defining the sleeve interior space, the at least one additional opening facing in a direction of the inner sleeve surface, the insulating element being located between the first end portion and the second end portion, the receptacles comprising a first electrical device conductor receiving receptacle, a second electrical device conductor receiving receptacle, a first connection cable conductor receiving receptacle and a second connection cable conductor receiving receptacle, the first electrical device conductor receiving receptacle being vertically offset from the second electrical device conductor receiving receptacle, the first connection cable conductor receiving receptacle being vertically offset from the second connection cable conductor receiving receptacle.

* * * * *